US008487587B2

(12) United States Patent
Guthrie

(10) Patent No.: US 8,487,587 B2
(45) Date of Patent: Jul. 16, 2013

(54) METHOD AND APPARATUS FOR DISPLAYING BATTERY FAULT NOTIFICATIONS ON WIRELESS DEVICES

(75) Inventor: Martin Guthrie, Moffat (CA)

(73) Assignee: Research In Motion Limited, Waterloo, Ontario (CA)

( * ) Notice: Subject to any disclaimer, the term of this patent is extended or adjusted under 35 U.S.C. 154(b) by 266 days.

(21) Appl. No.: 12/548,744

(22) Filed: Aug. 27, 2009

(65) Prior Publication Data

US 2009/0315730 A1  Dec. 24, 2009

Related U.S. Application Data

(63) Continuation of application No. 11/353,204, filed on Feb. 14, 2006, now Pat. No. 7,599,717.

(51) Int. Cl.
*H02J 7/00* (2006.01)
*H04M 1/00* (2006.01)
*H04B 1/38* (2006.01)

(52) U.S. Cl.
USPC ............................................ 320/136; 455/572

(58) Field of Classification Search
USPC ........... 320/106, 112, 132, 134, 136; 455/572
See application file for complete search history.

(56) References Cited

U.S. PATENT DOCUMENTS

| 5,619,117 | A | 4/1997 | Koenck |
| 6,005,367 | A * | 12/1999 | Rohde ............................ 320/106 |
| 6,366,809 | B1 | 4/2002 | Olson et al. |
| 6,456,036 | B1 * | 9/2002 | Thandiwe ...................... 320/106 |
| 7,599,717 | B2 * | 10/2009 | Guthrie .......................... 455/572 |
| 2005/0248311 | A1 * | 11/2005 | Komaki et al. ................. 320/112 |

FOREIGN PATENT DOCUMENTS

| EP | 1072285 A | 1/2001 |
| EP | 1072285 A1 | 1/2001 |

OTHER PUBLICATIONS

European Patent Office, "Extended European Search Report" for EP Application No. 06101633.3, dated Aug. 1, 2006.
IPulse, "Response to EP Search Report dated Aug. 1, 2006" dated Sep. 22, 2006.
European Patent Office, "Communication pursuant to Article 96(2) EPC" for EP Application No. 06101633.3, dated Aug. 16, 2007.
IPulse, "Response to Communication pursuant to Article 96(2) EPC dated Aug. 16, 2007", dated Feb. 20, 2008.
Canadian Intellectual Property Office, Examiner's Requisition for CA Application No. 2,573,997, dated Oct. 1, 2009.
Ogilvy Renault LLP, Response to Examiner's Requisition dated Oct. 1, 2009, dated Mar. 17, 2010.
United States Patent and Trademark Office, Office Action dated Nov. 26, 2012, issued in U.S. Appl. No. 13/611,845.
Norton Rose, Response to Office Action dated Feb. 26, 2013, filed in U.S. Appl. No. 13/611,845.

* cited by examiner

*Primary Examiner* — Jue Zhang
(74) *Attorney, Agent, or Firm* — Norton Rose Fulbright Canada LLP

(57) ABSTRACT

A battery pack for a mobile device, a method for processing fault notifications for a mobile device, and a mobile device for processing fault notifications are described. The battery pack comprises a housing, at least one battery cell within the housing, and a memory accessible by an application of the mobile device, the memory having stored thereon identifying information for identifying at least one of the battery pack and battery cell. Notifications are sent to mobile device including fault parameters for identifying at least one battery pack and/or battery cell affected by a fault. If the identifying information is within the fault parameters, displaying a fault notification on the display of the mobile device.

19 Claims, 6 Drawing Sheets

METHOD AND APPARATUS FOR DISPLAYING BATTERY FAULT NOTIFICATIONS ON WIRELESS DEVICES

CROSS REFERENCE TO RELATED APPLICATIONS

The present application is a continuation of U.S. application Ser. No. 11/353,204, filed Feb. 14, 2006, now issued to patent as U.S. Pat. No. 7,599,717, the entirety of which is hereby incorporated by reference.

FIELD OF THE APPLICATION

This application relates to fault notifications, and more specifically to a method and system for displaying battery fault notifications on wireless devices.

BACKGROUND

Wireless mobile communication devices include microprocessors, memory, batteries, soundcards, and run one or more software applications. Examples of software applications used in these wireless devices include Web browsers, address books, email clients, and Instant Messaging. Additionally, wireless devices have access to a plurality of services via the Internet. A wireless device may, for example, be used to browse Web sites on the Internet, transmit and receive graphics, and execute streaming audio and/or video applications.

Wireless devices are typically supplied with a battery pack which includes one or more cells for providing power to the wireless device. If there is an actual or potential fault or issue associated with the battery pack of a wireless device or one of its cells, it may be desirable to notify the user of the wireless device that his or her product is or may be affected by the fault or issue. Such faults or issues may affect the operation of the wireless device, and in some cases may represent a potential safety issue to the user of the wireless device.

A need therefore exists for a method and system for notifying a user of a wireless device of a fault in the battery pack and/or cells used in the wireless device.

BRIEF DESCRIPTION OF THE DRAWINGS

It will be noted that throughout the appended drawings, like features are identified by like reference numerals.

DETAILED DESCRIPTION OF THE PREFERRED EMBODIMENTS

Figure 1:
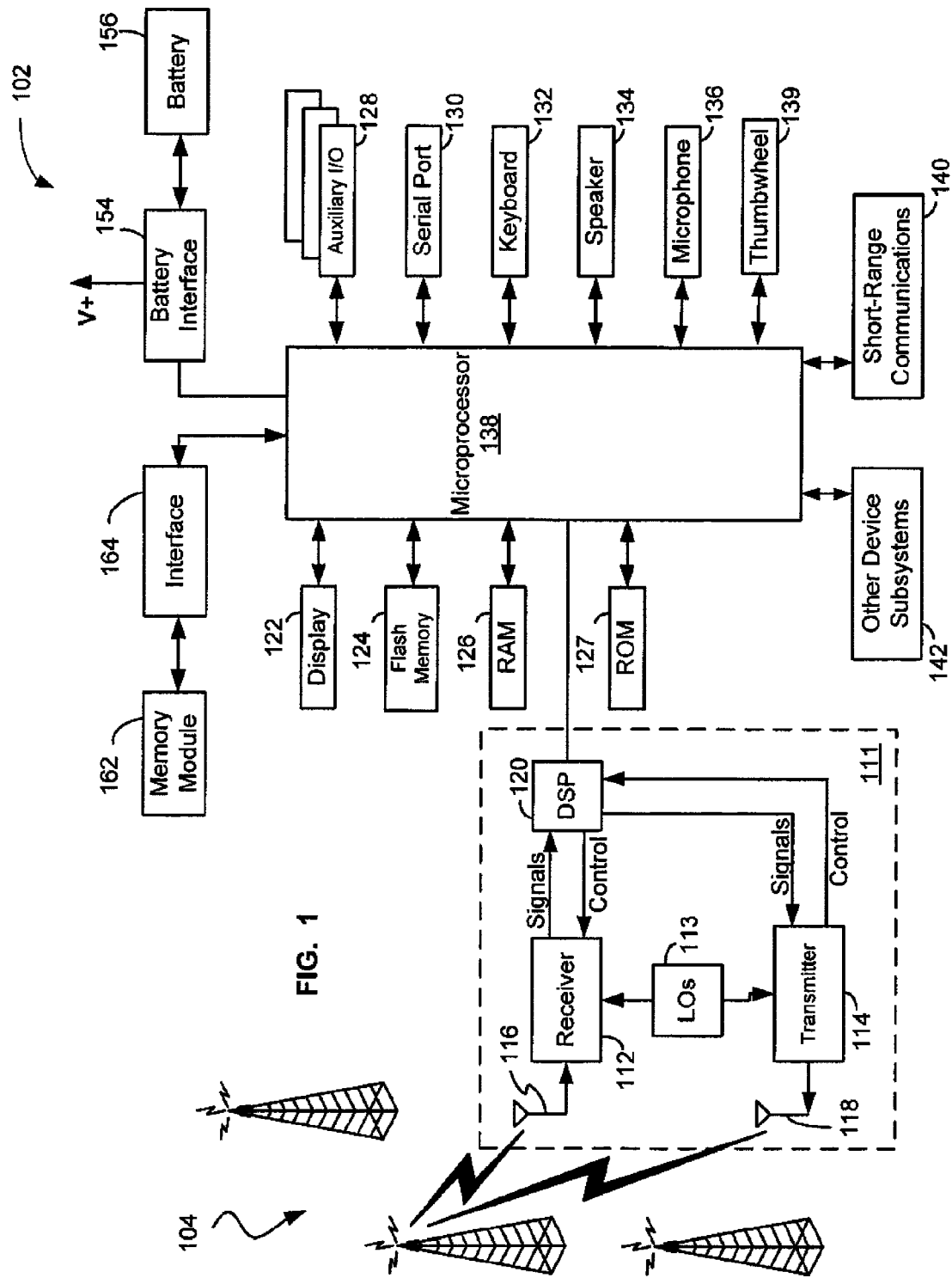
FIG. 1 is a block diagram illustrating an exemplary wireless device for communicating within a wireless communication network.

In accordance with one aspect of the present application, there is provided a battery pack for a mobile device, comprising: a housing; at least one battery cell within the housing; and a memory accessible by an application of the mobile device, the memory having stored thereon identifying information for identifying at least one of the battery pack and battery cell.

Preferably, the identifying information stored in the memory comprises at least one of: a unique identifier associated with the battery pack; a battery pack date code for identifying a date of manufacture of the battery pack; a battery pack lot code for identifying a manufacturing lot of the battery pack; and a battery pack model code for identifying a model of the battery pack.

Preferably, the identifying information stored in the memory comprises at least one of: a unique identifier associated with the battery cell; a battery cell date code for identifying a date of manufacture of the battery cell; a battery cell lot code for identifying a manufacturing lot of the battery cell; and a battery cell model code for identifying a model of the battery cell.

Preferably, the battery pack date code includes a component that represents a manufacturer of the battery pack and a date code component that represents the date of manufacture of the battery pack.

Preferably, the battery cell date code includes a component for identifying a manufacturer of the battery cell and a date code component that represents the date of manufacture of the battery cell.

Preferably, the battery pack further comprises a battery interface operatively connected to the battery cells for providing power to the mobile device.

Preferably, the battery pack further comprises a communications interface operatively connected to the memory for connecting the memory to the mobile device to provide communications therebetween.

In accordance with another aspect of the present application, there is provided a method for displaying fault notifications on a mobile device, the mobile device having a battery pack comprising one or more battery cells, a display, and a memory accessible by an application of the mobile device, the memory having stored thereon identifying information for identifying at least one of the battery pack and battery cell, the method comprising: receiving a notification on the mobile device, the notification including fault parameters for identifying at least one battery pack and/or battery cell affected by a fault; and if the identifying information is within the fault parameters, displaying a fault notification on the display of the mobile device.

Preferably, the method further comprises comparing on the mobile device the fault parameters with the identifying information stored in the memory of the battery pack.

Preferably, the method further comprises before receiving the notification on the mobile device, the steps of: determining on a server the fault parameters of the at least one the battery pack and/or battery cell affected by the fault; and sending the notification from the server to the mobile device.

In accordance with a further aspect of the present application, there is provided a method for displaying fault notifications on a mobile device, the mobile device having a battery pack comprising one or more battery cells, a display, and a memory accessible by an application of the mobile device, the memory having stored thereon identifying information for identifying at least one of the battery pack and battery cell, the method comprising: sending a request from the mobile device to a server to identify any faults affecting one or more of the battery pack and battery cell, the server being connected to a database containing fault parameters for identifying at least one battery pack and/or battery cell affected by a fault; if any faults affecting one or more of the battery pack and battery cell are identified, displaying a fault notification on the display of the mobile device.

Preferably, the method further comprises in response to the request, receiving a notification on the mobile device, the notification including the fault parameters for identifying at least one battery pack and/or battery cell affected by a fault; wherein the fault notification is displayed on the display of the mobile device if the identifying information is within the fault parameters.

Preferably, the method further comprises comparing on the mobile device the fault parameters with the identifying information stored in the memory of the battery pack.

Preferably, the request includes the identifying information stored in the memory of the battery pack, and further comprising comparing on the server the fault parameters with the identifying information stored in the memory of the battery pack, wherein the fault notification is displayed on the display of the mobile device if the identifying information is within the fault parameters.

Preferably, the method further comprises if no faults affecting one or more of the battery pack and battery cell are identified, displaying a no-fault notification on the display of the mobile device indicating that there are no faults affecting the battery pack or battery cell.

Preferably, the method further comprises if the identifying information is not within the fault parameters, displaying a no-fault notification on the display of the mobile device indicating that there are no faults affecting the battery pack or battery cell.

Preferably, the fault parameters include one or more unique identifiers associated with affected battery packs for comparison with a unique identifier associated with the battery pack in the identifying information stored in the memory.

Preferably, the fault parameters include one or more battery pack date codes identifying a date of manufacture of the affected battery packs for comparison with a battery pack date code identifying a date of manufacture of the battery pack in the identifying information in the memory.

Preferably, the fault parameters include one or more battery pack lot codes identifying a manufacturing lot of the affected battery packs for comparison with a battery pack lot code identifying a manufacturing lot of the battery pack in the identifying information stored in the memory.

Preferably, the fault parameters include one or more battery pack model codes identifying a model of the affected battery packs for comparison with a battery pack model code identifying a model of the battery pack in the identifying information stored in the memory.

Preferably, the fault parameters include one or more unique identifiers associated with affected battery cells for comparison with a unique identifier associated with the battery cell of the mobile device stored in the identifying information.

Preferably, the fault parameters include one or more battery cell date codes identifying a date of manufacture of the affected battery cells for comparison with a battery cell date code identifying a date of manufacture of the battery cell in the identifying information stored in the memory.

Preferably, the fault parameters include one or more battery cell lot codes identifying a manufacturing lot of the affected battery cells for comparison with a battery cell lot code identifying a manufacturing lot of the battery cell in the identifying information stored in the memory.

Preferably, the fault parameters include one or more battery cell model codes identifying a model of the affected battery cells for comparison with a battery cell model code identifying a model of the battery cell in the identifying information stored in the memory.

Preferably, the fault notification is an email message or a Short Message Service (SMS) message.

In accordance with a further aspect of the present application, there is provided a mobile device, comprising: a battery pack comprising one or more battery cells, a display, and a memory accessible by an application of the mobile device, the memory having stored thereon identifying information for identifying at least one of the battery pack and battery cell; and a processor coupled to a memory, the memory having stored thereon data and instructions that configure the device to: receive a notification including fault parameters for identifying at least one battery pack and/or battery cell affected by a fault; and display a fault notification on the display if the identifying information is within the fault parameters.

In accordance with a further aspect of the present application, there is provided a mobile device, comprising: a battery pack comprising one or more battery cells, a display, and a memory accessible by an application of the mobile device, the memory having stored thereon identifying information for identifying at least one of the battery pack and battery cell; and a processor coupled to a memory, the memory having stored thereon data and instructions that configure the device to: send a request in response to a user input to a server to identify any faults affecting one or more of the battery pack and battery cell, the server being connected to a database containing fault parameters for identifying at least one battery pack and/or battery cell affected by a fault; and display a fault notification on the display if any faults affecting one or more of the battery pack and battery cell are identified.

In accordance with further aspects of the present application, there is provided articles of manufacture such as a machine or computer readable medium having program instructions recorded thereon for practising the method(s) of the application, a server having a processor and memory having data and instructions to configure the server for practising the method(s) of the application, and a computer data signal having program instructions recorded therein for practising the method(s) of the application.

FIG. 1 is a block diagram illustrating an exemplary wireless device 102. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway (not shown) and to a wide area network (not shown).

The wireless device 102 is preferably a two-way communication device having at least voice and advanced data communication capabilities, including the capability to communicate with other computer systems. Typically, the wireless device 102 is a handheld device. Depending on the functionality provided by the wireless device 102, it may be referred to as a data messaging device, a two-way pager, a cellular telephone with data messaging capabilities, a wireless Internet appliance, or a data communication device (with or without telephony capabilities). The wireless device 102 may communicate with any one of a plurality of fixed transceiver stations within its geographic coverage area.

The wireless device 102 will normally incorporate a communication subsystem 111, which includes a receiver 112, a transmitter 114, and associated components, such as one or more (preferably embedded or internal) antenna elements 116 and 118, local oscillators (LOs) 113, and a processing module such as a digital signal processor (DSP) 120. As will be apparent to those skilled in field of communications, the particular design of the communication subsystem 111 depends on the wireless network 104 in which wireless device 102 is intended to operate.

The wireless device 102 may send and receive communication signals over the wireless network 104 after the required network registration or activation procedures have been completed. Signals received by the antenna 116 through the wireless network 104 are input to the receiver 112, which may perform such common receiver functions as signal amplification, frequency down conversion, filtering, channel selection, and the like, and analog-to-digital (A/D) conversion. A/D conversion of a received signal allows more complex communication functions such as demodulation and decoding to be performed in the DSP 120. In a similar manner, signals to be transmitted are processed, including modulation and encoding, for example, by DSP 120. These DSP-processed signals are input to the transmitter 114 for digital-to-analog (D/A) conversion, frequency up conversion, filtering, amplification and transmission over the wireless network 104 via the antenna 118. The DSP 120 not only processes communication signals, but also provides for receiver and transmitter control. For example, the gains applied to communication signals in the receiver 112 and the transmitter 114 may be adaptively controlled through automatic gain control algorithms implemented in the DSP 120.

Network access is associated with a subscriber or user of the wireless device 102, and therefore the wireless device 102 requires a memory module 162, such as a Subscriber Identity Module (SIM) card or a Removable User Identity Module (R-UIM), to be inserted in or connected to an interface 164 of the wireless device 102 in order to operate in the wireless network 104. Alternatively, the memory module 162 may be a non-volatile memory which is programmed with configuration data by a service provider so that the wireless device 102 may operate in the wireless network 104. Since the wireless device 102 is a mobile battery-powered device, it also includes a battery interface 154 for receiving one or more rechargeable batteries 156. The battery 156 provides electrical power to most, if not all, electrical circuitry in the wireless device 102, and the battery interface 154 provides a mechanical and electrical connection for it. The battery interface 154 is coupled to a regulator (not shown) which provides power V+ to the circuitry of the wireless device 102.

The wireless device 102 includes a microprocessor 138 which controls the overall operation of the wireless device 102. Communication functions, including at least data and voice communications, are performed through communication subsystem 111. The microprocessor 138 also interacts with additional device subsystems such as a display 122, a flash memory 124, a random access memory (RAM) 126, a read-only access memory (ROM) 127, auxiliary input/output (I/O) subsystems 128, a data port such as serial port 130, a keyboard or keypad 132, a speaker 134, a microphone 136, a clickable thumbwheel or trackwheel 139, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keypad 132, display 122, and clickable thumbwheel 139, for example, may be used for both communication-related functions, such as entering a text message for transmission over the wireless network 104, and device-resident functions such as a calculator or task list. Operating system software used by the microprocessor 138 is preferably stored in a persistent store such as flash memory 124, which may alternatively be ROM 127 or similar storage element. Those skilled in the art will appreciate that the operating system, specific device applications, or parts thereof, may be temporarily loaded into a volatile store such as RAM 126.

The microprocessor 138, in addition to its operating system functions, preferably enables execution of software applications on the wireless device 102. A predetermined set of applications which control basic device operations, including at least data and voice communication applications, will normally be installed on the wireless device 102 during its manufacture. A preferred application that may be loaded onto wireless device 102 may be a personal information manager (PIM) application having the ability to organize and manage data items relating to user such as, but not limited to, instant messaging, email, calendar events, voice mails, appointments, and task items. Naturally, one or more memory stores are available on the wireless device 102 and the memory module 162 to facilitate storage of PIM data items and other information.

The PIM application preferably has the ability to send and receive data items via the wireless network 104. In one embodiment, PIM data items are seamlessly integrated, synchronized, and updated via the wireless network 104, with the wireless device user's corresponding data items stored and/or associated with a host computer system thereby creating a mirrored host computer on the wireless device 102 with respect to such items. This is especially advantageous where the host computer system is the wireless device user's office computer system. Additional applications may also be loaded onto the wireless device 102 through the wireless network 104, the auxiliary I/O subsystem 128, the serial port 130, the short-range communications subsystem 140, or any other suitable subsystem 142, and installed by a user in RAM 126 or preferably a non-volatile store (not shown) for execution by the microprocessor 138. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received signal such as a text message, an email message, or Web page download will be processed by the communication subsystem 111 and input to the microprocessor 138. The microprocessor 138 will preferably further process the signal for output to the display 122 or alternatively to the auxiliary I/O device 128. A user of the wireless device 102 may also compose data items, such as email messages, for example, using the keypad 132 and the clickable thumbwheel 139 in conjunction with the display 122 and possibly the auxiliary I/O device 128. The keypad 132 is preferably a complete alphanumeric keypad and/or telephone-type keypad. These composed items may be transmitted over the wireless network 104 through the communication subsystem 111 or the short range communication subsystem 140.

For voice communications, the overall operation of the wireless device 102 is substantially similar, except that the received signals would be output to the speaker 134 and signals for transmission would be generated by the microphone 136. Alternative voice or audio I/O subsystems, such as a voice message recording subsystem, may also be implemented on the wireless device 102. Although voice or audio signal output is preferably accomplished primarily through the speaker 134, the display 122 may also be used to provide an indication of the identity of a calling party, duration of a voice call, or other voice call related information.

The serial port 130 is normally implemented in a personal digital assistant (PDA)-type communication device for which synchronization with a user's desktop computer is a desirable, albeit optional, component. The serial port 130 enables a user to set preferences through an external device or software application and extends the capabilities of the wireless device 102 by providing for information or software downloads to the wireless device 102 other than through the wireless network 104. The alternate download path may, for example, be used to load an encryption key onto the wireless device 102 through a direct and thus reliable and trusted connection to thereby provide secure device communication.

The short-range communications subsystem 140 is an additional optional component which provides for communication between the wireless device 102 and different systems or devices, which need not necessarily be similar devices. For example, the subsystem 140 may include an infrared device and associated circuits and components, or a Bluetooth™ communication module to provide for communication with similarly-enabled systems and devices (Bluetooth™ is a registered trademark of Bluetooth SIG, Inc.).

Figure 2:
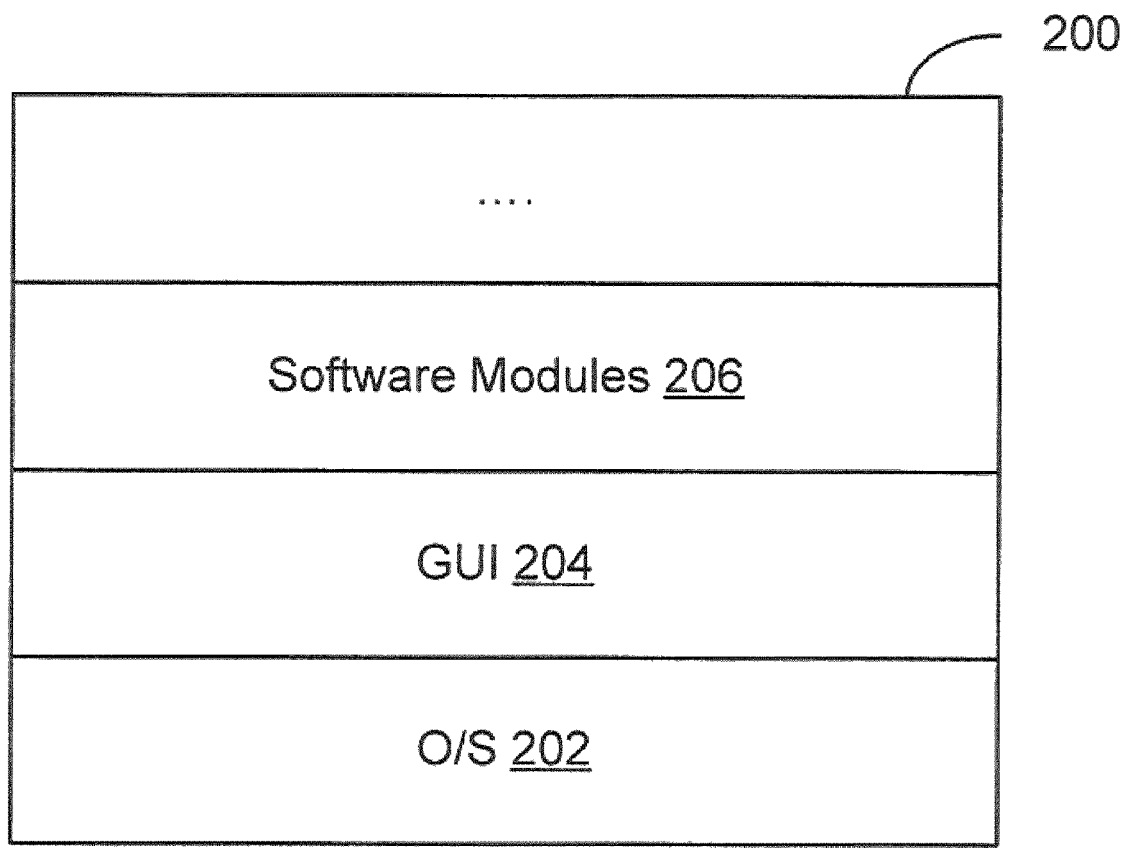
FIG. 2 is a block diagram illustrating a memory of the wireless device of FIG. 1.

FIG. 2 is a block diagram illustrating a memory 200 of the wireless device 102. The memory 200 has various software components for controlling the wireless device 102 and may include, for example, flash memory 124, RAM 126 and/or ROM 127. In accordance with one embodiment, the wireless device 102 is intended to be a multi-tasking wireless communications device configured for sending and receiving data items and for making and receiving voice calls. To provide a user-friendly environment to control the operation of the wireless device 102, an operating system 202 resident on the wireless device 102 provides a basic set of operations for supporting various applications typically operable through a graphical user interface (GUI) 204. For example, the operating system 202 provides basic input/output system features to obtain input from the auxiliary I/O 128, keypad 132, clickable thumbwheel 139, and other input devices, and to facilitate output to the user via the display 122. One or more software modules 206 for managing communications or providing a personal digital assistant (PDA) or other functions may also be included.

Thus, the wireless device 102 includes computer executable programmed instructions for directing the wireless device 102 to implement various applications. The programmed instructions may be embodied in one or more software modules 206 resident in the memory 200 of the wireless device 102. Alternatively, the programmed instructions may be embodied on a computer readable medium (such as a DVD, CD, floppy disk or other storage media) which may be used for transporting the programmed instructions to the memory 200 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 111, 130, 140 to the wireless device 102 from the wireless network 104 by end users.

Figure 3:
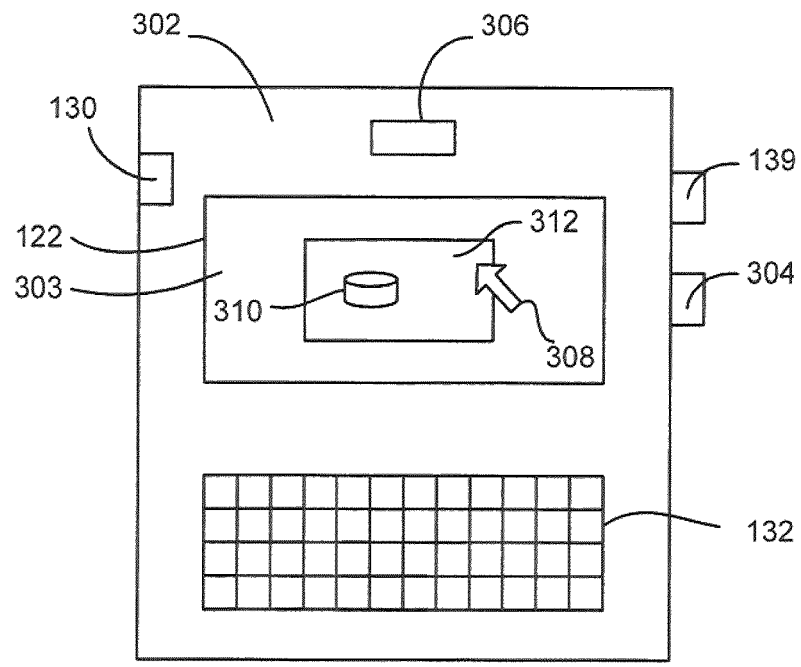
FIG. 3 is a front view illustrating the wireless device of FIG. 1.

FIG. 3 is a front view of the wireless device 102. As mentioned above, the wireless device 102 may be a data and voice-enabled handheld device. The wireless device 102 includes a casing 302, data or serial port 130, display screen 122, graphical user interface (GUI) 303, keypad 132, clickable thumbwheel 139, one or more input buttons 304 (e.g. select, cancel buttons), and signal inputs/outputs 306 (e.g., power connector input, microphone, speaker, data interface input, etc.). Internally, the wireless device 102 includes one or more circuit boards, a microprocessor 138, a memory 200, a battery 156, an antenna 116, 118, etc., which are coupled to the signal inputs/outputs 306, keypad 132, display screen 122, clickable thumbwheel 139, etc.

The microprocessor 138 is typically coupled to one or more input devices (e.g. buttons 304, keypad 132, clickable thumbwheel 139) for receiving user commands or queries and the display 122 for displaying the results of these commands or queries. For example, user queries may be transformed into a combination of commands for producing one or more tables of output data which may be incorporated in one or more display pages for presentation to the user. The microprocessor 138 is also coupled to the memory 200 containing the software modules 206 and data such as database tables.

A user may interact with the wireless device 102 and its software modules 206 using the GUI 303. The GUI 303 is supported by the operating system 202 and provides a display format enabling the user to choose commands, execute application programs, manage computer files, and perform other functions by selecting pictorial representations known as icons, or selecting items from a menu through the use of an input or pointing device such as a clickable thumbwheel 139 and/or keypad 132. Generally, the GUI 303 is used to convey information and receive commands from users, and generally includes a variety of GUI objects or controls including icons, toolbars, drop-down menus, pop-up menus, text, dialog boxes, buttons, and the like. A user typically interacts with the GUI 303 presented on the display 122 by using the input or pointing device to position a pointer or cursor 308 over an object 310 (i.e., "pointing" at the object) and by "clicking" on the object 310. (e.g., by depressing the thumbwheel 139 or a button on the keyboard 132, etc.). This is often referred to as a point-and-click operation or a selection operation. Typically, the object 310 may be highlighted (e.g., shaded) when it is selected or pointed at by the pointer or cursor 308.

Typically, a GUI-based system presents application, status, and other information to the user in windows appearing on the display 122. A window 312 is a display area within the display 122, typically rectangular, in which a user may view an application or document. A window 312 may be open, closed, displayed full screen, reduced to an icon, increased or reduced in size, or moved to different areas of the display 122. Multiple windows 312 may be displayed simultaneously. For example, windows 312 may be displayed within other windows, overlapped other windows, or tiled within the display area.

Figure 4:
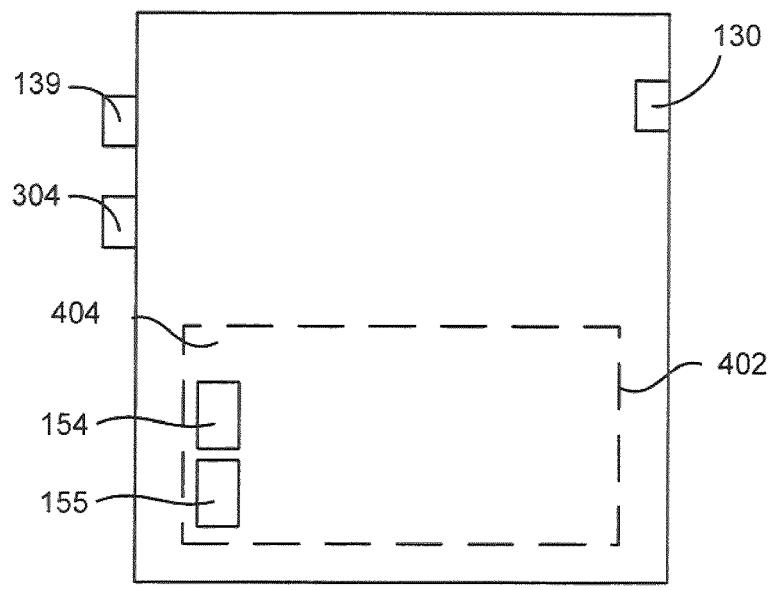
FIG. 4 is a rear view illustrating the wireless device of FIG. 1.

FIG. 4 is a rear view illustrating the wireless device 102. The wireless device 102 has a removable rear casing or casing portion 402 for concealing a battery cavity 404. The battery interface 154 for the battery 156 and a communications interface 155 are provided within the battery cavity 404. In the present embodiment, the battery 156 is a removable battery pack 502 (see FIGS. 5 and 6) having a battery pack housing 504. A portion of the battery pack housing 504 may form the removable rear portion 402 of the casing 302 of the wireless device 102 or a portion thereof. Alternatively, the battery pack 502 may be enclosed within the battery cavity 404 and entirely separate from the removable rear portion 402 of the casing 302.

Figure 5:
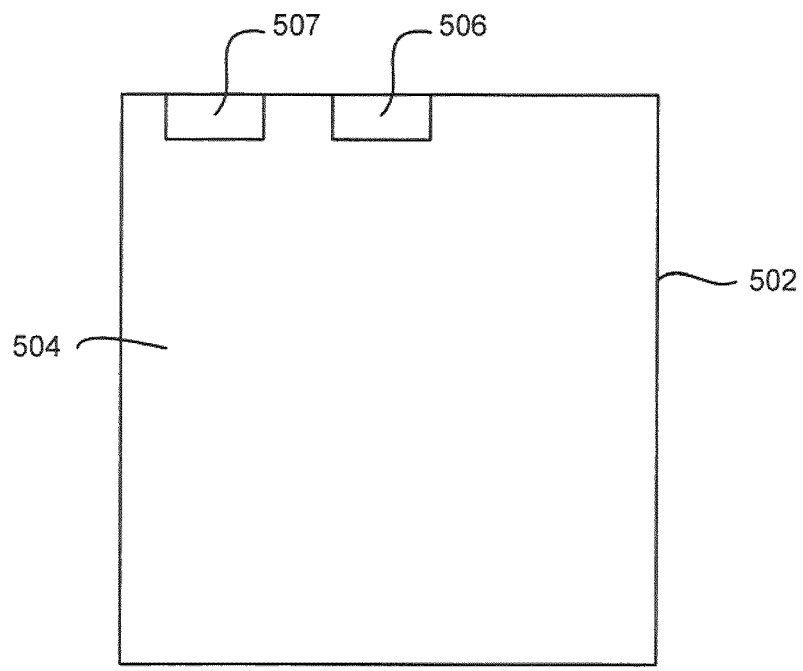
FIG. 5 is a front view illustrating a battery pack for use with the wireless device of FIG. 1 in accordance with an embodiment of the application.
Figure 6:
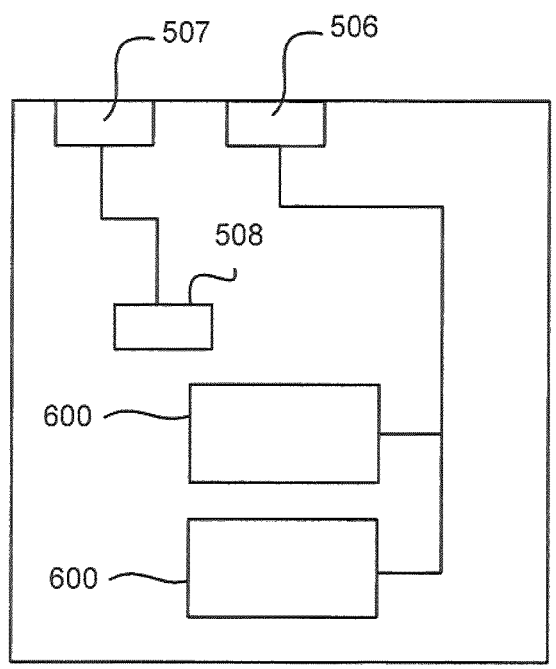
FIG. 6 is a front sectional view illustrating cells within the battery pack of FIG. 5 in accordance with an embodiment of the application.
Figure 7:
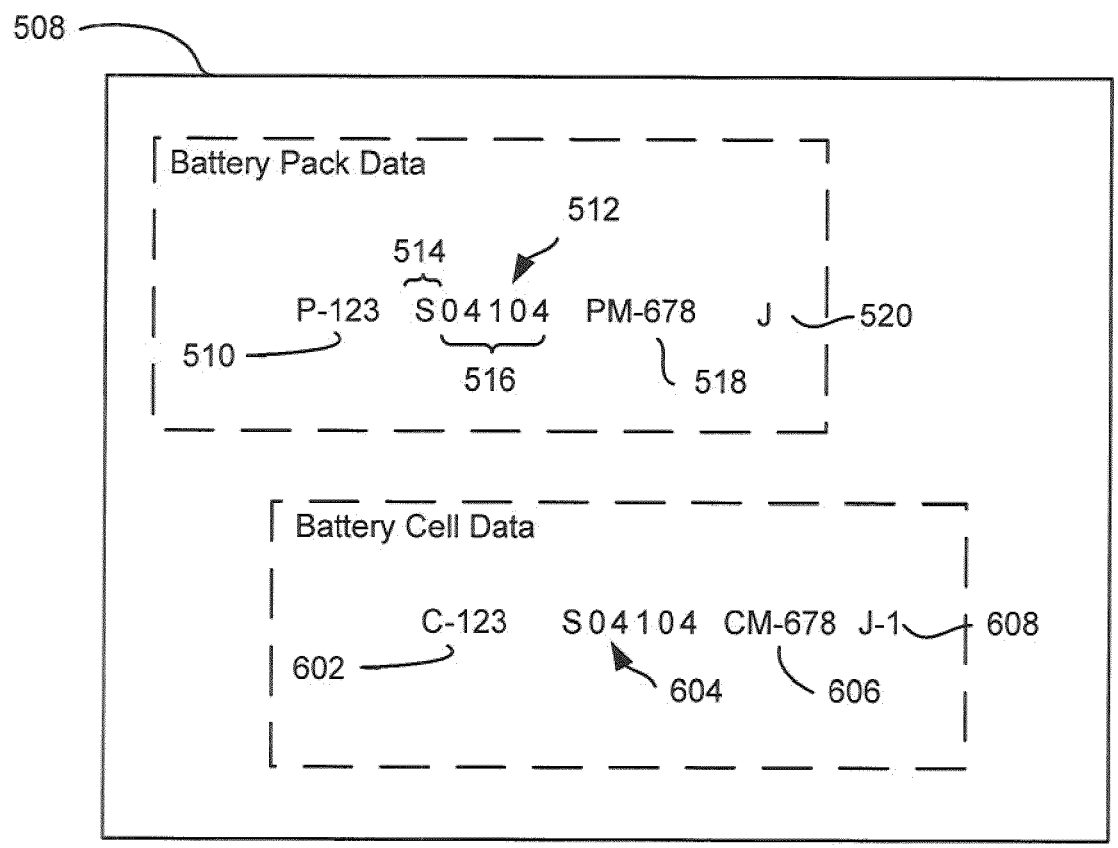
FIG. 7 is a diagrammatic representation of a memory of the battery pack of FIG. 5 in accordance with an embodiment of the application.

FIG. 5 is a front view illustrating a battery pack 502 for the wireless device 102 in accordance with an embodiment of the application. FIG. 6 is a front sectional view illustrating cells 600 of the battery pack 502 of FIG. 5 in accordance with an embodiment of the application. FIG. 7 is a diagrammatic representation of a memory 508 of the battery pack 502 of FIG. 5 in accordance with an embodiment of the application.

Referring now to FIGS. 5 and 6, the battery pack 502 includes a battery pack housing 504 and one or more battery cells 600 within the housing 504. The battery pack 502 may also include a memory 508 accessible by an application of the wireless device 102. The memory 508 is a memory chip or other medium readable by the wireless device 102 (e.g. the processor 138). Preferably, the memory 508 has stored thereon identifying information for identifying at least one of the battery pack 502 and battery cell 600. The memory 508 (e.g. embedded or resident memory) may be volatile memory such as RAM or non-volatile memory as ROM.

The battery pack 502 also has a battery interface 506 (e.g., battery contacts) operatively connected to the battery cells 600 and adapted to provide power to the wireless device 102, and a data port or communications interface 507 operatively connected to the memory 508 and adapted for communicating or transmitting data between the memory 508 and the wireless device 102. In some embodiments, the communications interface 507 is a single wire, serial half-duplex connection, however any suitable data port or communications interface may be used. Alternatively, a wireless connection between the memory 508 and the wireless device 102 may be implemented to avoid a wired connection, which may have reliability problems. Suitable wired and wireless communications interfaces would be understood to a person of ordinary skill in the art.

When the battery pack 502 is installed in the wireless device 102, the battery interface 506 of the battery pack 502 connects with the battery interface 154 in the battery cavity 404 to provide power to the wireless device 102, and the communications interface 507 of the battery pack 502 connects with the communications interface 155 in the battery cavity 404 to provide communications between the memory 508 and the wireless device 102.

The battery pack 502 is preferably associated with the identifying information stored in the memory 508. Alternatively, the identifying information may be stored in the main memory 200 of the wireless device 102, for example, if the battery pack 502 is of the non-removable type. The identifying information may comprise one or more of the following: a unique identifier (e.g. battery pack serial number 510) associated with the battery pack 502; a battery pack date code 512 for identifying a date of manufacture of the battery pack 502; a battery pack lot code 518 for identifying a manufacturing lot of the battery pack 502; and a battery pack model code 520 for identifying a model of the battery pack 502. Exemplary identifying information for a battery pack 502 is provided in Table 1 below, and the corresponding information in the memory 508 is provided in FIG. 7.

The battery pack serial number 510 provides a unique identifier for uniquely identifying each battery pack 502. The battery pack serial number 510 is associated with cell and battery pack manufacturing information such as the date codes, lot codes and pack model numbers, as is described in more detail below.

The battery pack date code 512 may comprise a manufacturer code component 514 that represents the name of the manufacturer and a date code component 516 that represents the date of manufacture. An example embodiment of the battery pack date code 512 will now be explained with reference to an exemplary battery pack date code "S04044". According to this embodiment, the battery pack date code 512 (e.g., "S04044") includes a single uppercase letter "S" representing the name of the manufacturer for example Sanyo™ (manufacturer code component 514), and a 5-digit number "04044" representing the date of manufacture (date code component 516). In one example embodiment, the first two numeric digits in the date code component 516 ("04") represent the year of manufacture, the second two digits ("10") represent the week, and the final digit ("4") represents the day of week, where Sunday is considered the first day of the week. The year code (i.e., "04") is updated at the start of the first week in the year. Thus, according to this example embodiment if Sanyo™ manufactured the battery pack 502 on Mar. 10, 2004, the battery pack date code 512 would be "S04044", where "04" represents the year 2004, "10" represents the $10^{th}$ week in the year, and "4" represents the $4^{th}$ day of the week. Alternate formats for the battery pack date code 512 may be used in other embodiments (e.g., day/month/year, etc.).

The battery pack lot code 518 identifies the manufacturing lot of the battery pack 502. The battery pack date code 512 and battery pack lot code 518 provide traceability of components of the battery pack 502 (e.g., a protection circuit, a thermal fuse, cells 600, plastics components, etc.) according to the date of manufacture (and optionally the name of manufacturer where a manufacturer code component 514 is provided) and production lot respectively. Typically, either a battery pack date code 512 or battery pack lot code 518 is provided, not both.

The battery pack model code 520 identifies a model of the battery pack 502.

The identifying information may also comprise, in addition to or in place of the battery pack identifying information 510, 512, 518 and 520, one or more of the following: a unique identifier (e.g. battery cell number 602) associated with the battery cell 600; a battery cell date code 604 for identifying a date of manufacture of the battery cell 600; a battery cell lot code 606 for identifying a manufacturing lot of the battery cell 600; and a battery cell model code 608 for identifying a model of the battery cell 600. Exemplary identifying information for a battery cell 600 is provided in Table 2 below, and the corresponding information in the memory 508 is provided in FIG. 7.

TABLE 1

Battery Pack Association List

| Battery pack serial number 510 | Battery pack date code 512 S04044 | | | |
|---|---|---|---|---|
| | Manufacturer code component 514 | Date code component 516 | Battery pack lot code 518 | Battery pack model code 520 |
| P-123 | S | 04044 | PM-678 | "J" |

TABLE 2

Battery Cell Association List

| Battery cell serial number 602 | Battery cell date code 604 S04044 | | | |
|---|---|---|---|---|
| | Manufacturer code component | Date code component | Battery cell lot code 606 | Battery cell model code 608 |
| C-123 | S | 04044 | CM-678 | "J1" |

The battery cell number 602 provides a unique identifier for uniquely identifying each battery cell 600 in the battery pack 502. The battery cell date code 604 identifies a date of manufacture of the respective cell 600 and will be the same for all cells 600 in the battery pack 502 if manufactured on the same day. However, it also possible that the cells 600 are manufactured on different dates and so the date code 604 may be different for different cells 600 in the battery pack 502. The battery cell date code 604 may be structured in a manner similar to that of the battery pack date code 512 described above. The battery cell lot code 606 identifies the manufacturing lot of the battery cell 600.

The battery cell date code 604 and battery cell lot code 606 provide traceability of the battery cells 600 according to the date of manufacture (and optionally name of manufacturer where a manufacturer code component is provided) and production lot respectively. Typically, either a battery cell date code 604 or battery pack lot code 606 is provided, not both.

The battery cell model code 608 identifies a model of the battery cell 600.

The identifying information of the battery pack 502 is also stored in an external list or table in a production database (not shown) maintained by the manufacturer of the battery pack 502 or wireless device 102, or other party responsible for quality control. It will be appreciated that for removable battery packs 502, the battery pack 502 used with a particular wireless device 102 may change over time, for example as the battery pack 502 needs to be replaced.

Typically, the memory 508 is programmed with the identifying information prior to being built into the battery pack 502 during its production. For example, the memory 508 may have the serial number 510 and other identifying information stored or programmed therein and possibly. During the production of the battery pack 502, the serial number 510 of the memory 508 and other identifying information is recorded, for example during a production test of the battery pack 502. The battery pack manufacturer or other party then maintains an association of the battery pack serial number 510 and identifying information concerning the battery pack 502 and/or its components (e.g. battery cell lot code 606, battery cell date code 604, and possibly assembly line and plant location) in the production database.

When a manufacturing fault or issue affecting the battery packs 502 and/or battery cells 600 is identified, the respective identifying information of the affected battery pack 502 and/or battery cell 600 is determined. The production database is then updated to indicate that the battery packs 502 and/or battery cells 600, identified by the respective identifying information, is affected by the identified fault or issue. The respective identifying information of the affected battery packs 502 and/or battery cells 600 define fault parameters. A notification containing the fault parameter may then be sent from a production or maintenance server connected to the production database to the wireless devices 102 affected or potentially affected by the identified fault. For example, if a manufacturing problem is identified for a particular battery pack model on a particular date or a range of dates, a fault notification may be sent over the wireless network 104 to all wireless devices 102, the notification including the battery pack date code(s) 512 and battery pack model code 520 associated with the manufacturing problem as fault parameters within the notification. Alternatively, the production database may be queried to identify the battery pack serial numbers 510 of each of the affected battery packs, i.e. the battery packs 502 associated with the battery pack date code 512 and battery pack model code 520. The battery pack serial numbers 510 of the affected battery packs may then be included as fault parameters within the notification, thereby providing narrower fault parameters requiring less on-device processing of the notification.

The notification may be an email message or Short Message Service (SMS) message. The notification is received by the operating system 202 or other application on the wireless device 102 which determines if the battery pack 502 and/or one of its battery cells 600 is within the fault parameters. If the battery pack 502 and/or battery cell 600 is within the fault parameters, the notification is displayed. The notification may include information concerning the fault or issue and/or any recall or recommended repair, replacement or diagnostic testing for the battery pack 502. If the battery pack 502 and/or battery cell 600 is not within the fault parameters, the message is not displayed. Alternatively, a no-fault notification informing the user that there are no device faults to report may be displayed.

Figure 8:
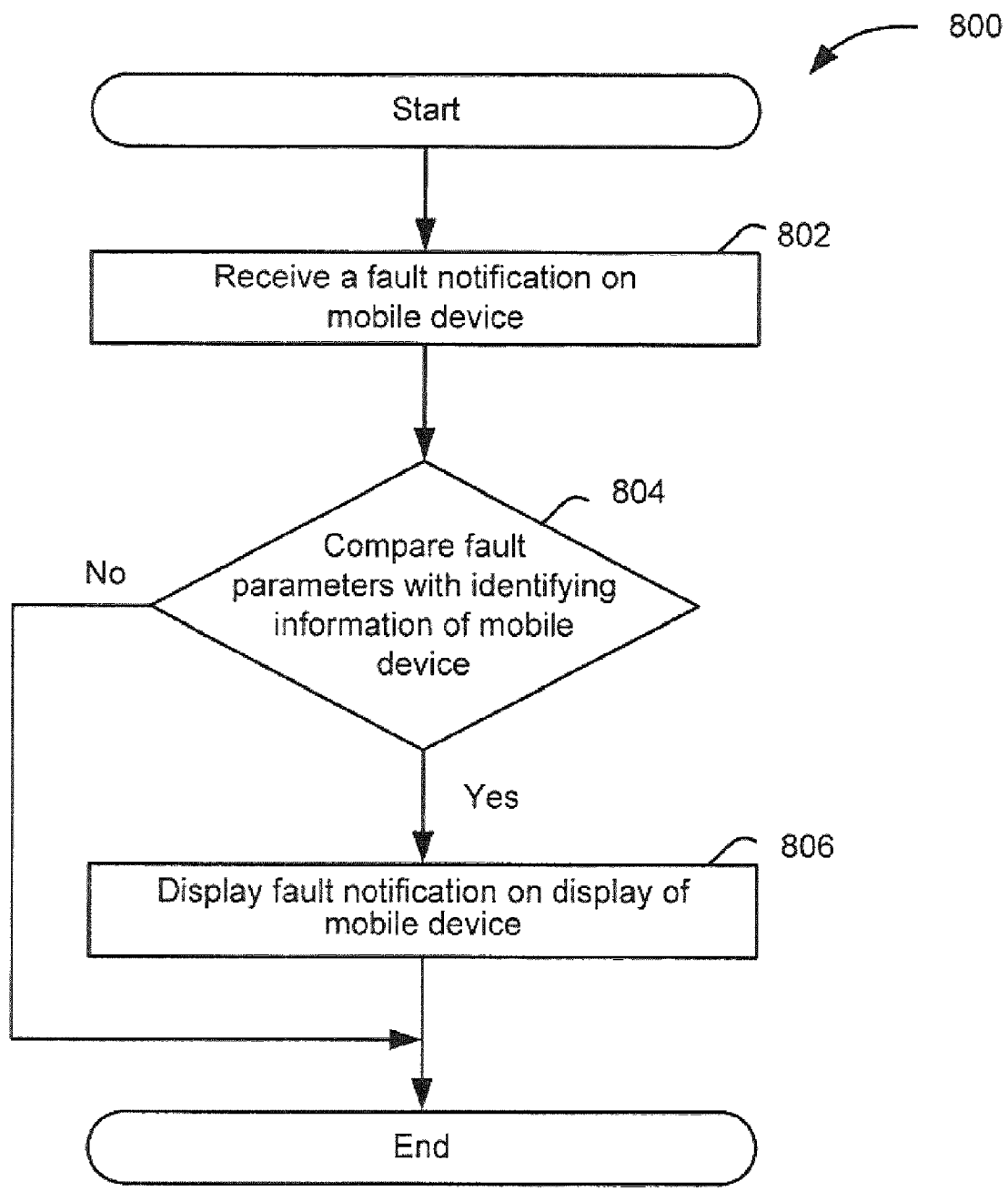
FIG. 8 is a flowchart illustrating exemplary operations for processing fault notifications for the wireless device of FIG. 1 in accordance with an embodiment of the application.

FIG. 8 is a flowchart illustrating exemplary operations 800 for processing fault notifications for the wireless device 102 in accordance with an embodiment of the application. Fault notifications are sent from a remote server (not shown) to the wireless device 102 when a fault has been identified and it has been determined that a fault notification should be sent to affected mobile devices 102. The wireless device 102 includes a battery pack 502 comprising one or more battery cells 600, a display 122 and a memory 508.

In the first step 802, a fault notification is received on the wireless device 102 concerning a fault associated with at least one of the battery pack 502 and battery cell 600 of wireless devices 102. The fault notification includes fault parameters for identifying mobile devices 102 affected by the fault, i.e. having an affected battery pack 502 and/or battery cells 600. The notification may be an email message or a SMS message.

Next, in step 804 the fault parameters of the fault notification are compared with identifying information stored in the memory 508 of the wireless device 102. If identifying information stored in the memory 508 of the wireless device 102 is within the fault parameters, operations proceed to step 806 where a fault notification is displayed on the display 122 of the wireless device 102. If the identifying information is not within the fault parameters, operations end.

The foregoing example embodiments describe a "push" methodology in which fault notifications are sent to wireless devices 102 from a server and then processed on the wireless devices 102. A notification is then displayed on the display of a wireless device 102 if it is determined that the device is within the fault parameters. However, the present application is not limited to a "push" methodology. A "pull" model for delivering fault notifications may also be employed in which a wireless device 102 may access a server which determines if the wireless device 102 is affected by a fault. The server then instructs the wireless device to display a notification on the display of the wireless device if it is determined that the device is within the fault parameters.

An embodiment of a "pull model" for delivering fault notifications will now be described. The wireless device 102 is provided with a special function or application which, in response to a user input (i.e. a user request), sends a request to a server connected to the production database over the wireless network 104 to identify any faults identified with the battery pack 502 and/or one of its battery cells 600. Typically, the wireless device 102 sends to the server the identifying information stored in the memory 508 of the wireless device 102. The fault parameters for which a fault has been identified or for which recalls or fault notifications have been issued are then compared with the identifying information. If the identifying information is within the fault parameters, the server instructs the wireless device 102 to display a fault notification on the display 122 of the wireless device 102. If the identifying information is not within the fault parameters, no notification is displayed. Alternatively, if the identifying information is not within the fault parameters, the server may instruct the wireless device 102 to display a no-fault notification on the display 122 informing the user that there are no device faults to report (e.g. in relation to the battery pack 502 and/or battery cells 600).

In an alternate embodiment of a pull model, in response to the user request, the server may send a notification to the mobile device 102, the notification including the fault parameters for identifying at least one battery pack and/or battery cell affected by a fault. The mobile device 102 may then compare the fault parameters with the identifying information stored in the memory 508 of the battery pack 502. If the identifying information is within the fault parameters, a fault notification is displayed on the display 122 of the mobile device 102. If the identifying information is not within the fault parameters, no notification is displayed. Alternatively, if the identifying information is not within the fault parameters, the server may instruct the wireless device 102 to display a no-fault notification on the display 122 informing the user that there are no device faults to report (e.g. in relation to the battery pack 502 and/or battery cells 600).

Although the application has been described in relation to example embodiments in which notifications are related to faults or issues associated with battery pack 502 and/or battery cells 600, it will be appreciated that the method of the present application may be adapted for delivering and processing notifications related to other components of wireless and other mobile devices. For example, the method may be adapted for notification related to a charger for a battery pack of the device.

While this application is primarily discussed as a method, a person of ordinary skill in the art will understand that the apparatus discussed above with reference to a wireless device 102 and server, may be programmed to enable the practice of the method of the application. Moreover, an article of manufacture for use with a wireless device 102, such as a pre-recorded storage device or other similar computer readable medium including program instructions recorded thereon, may direct the wireless device 102 to facilitate the practice of the method of the application. It is understood that such apparatus and articles of manufacture also come within the scope of the application.

The embodiments of the application described above are intended to be examples only. Those of skill in the art may effect alterations, modifications and variations to the particular embodiments without departing from the scope of the application. The subject matter described herein in the recited claims intends to cover and embrace all suitable changes in technology.

The invention claimed is:

1. A battery pack for a mobile device, comprising:
    a battery cell; and
    a memory accessible by an application of the mobile device, and having stored thereon identifying information identifying at least one of the battery pack and the battery cell;
    wherein the mobile device is configured to:
        receive a notification from a server, comprising fault parameters identifying at least one battery pack and/or battery cell affected by a fault; and
        compare the fault parameters in the notification with the identifying information stored in the memory to determine if the identifying information is within the fault parameters, and if so, display a fault notification on a display of the mobile device.

2. The battery pack of claim 1, wherein the identifying information stored in the memory comprises at least one of: a unique identifier associated with the battery pack; a battery pack date code for identifying a date of manufacture of the battery pack; a battery pack lot code for identifying a manufacturing lot of the battery pack; and a battery pack model code for identifying a model of the battery pack.

3. The battery pack of claim 1, wherein the identifying information stored in the memory comprises at least one of: a unique identifier associated with the battery cell; a battery cell date code for identifying a date of manufacture of the battery cell; a battery cell lot code for identifying a manufacturing lot of the battery cell; and a battery cell model code for identifying a model of the battery cell.

4. The battery pack of claim 2, wherein the battery pack date code includes a component that represents a manufacturer of the battery pack and a date code component that represents the date of manufacture of the battery pack.

5. The battery pack of claim 3, wherein the battery cell date code includes a component for identifying a manufacturer of the battery cell and a date code component that represents the date of manufacture of the battery cell.

6. The battery pack of claim 1, further comprising a battery interface operatively connected to the at least one battery cell for providing power to the mobile device.

7. The battery pack of claim 6, further comprising a communications interface operatively connected to the memory for connecting the memory to the mobile device to provide communications therebetween.

8. The battery pack of claim 1, wherein the mobile device is further configured to:
    send a request from the mobile device to the server to identify any faults affecting one or more of the battery pack and the battery cell, the server being connected to a database containing fault parameters for identifying at least one battery pack and/or battery cell affected by a fault.

9. A battery pack for use with a mobile device, comprising:
    a battery cell; and
    a memory accessible by an application of the mobile device, and having stored thereon identifying information identifying at least one of the battery pack and the battery cell;
    wherein the mobile device is configured to:
        send a request to a server to identify any faults affecting the battery pack and/or the battery cell, the server being connected to a database containing fault parameters identifying at least one battery pack and/or battery cell affected by a fault;
        receive a notification from the server, comprising the fault parameters identifying the at least one battery pack and/or battery cell affected by the fault; and
        compare the fault parameters in the notification with the identifying information stored in the memory to determine if the battery pack and/or the battery cell are affected by the fault, and if so, display a fault notification on the display of the mobile device.

10. The battery pack of claim 9, wherein the mobile device is configured to display the fault notification on the display of the mobile device if the identifying information is determined to be within the fault parameters.

11. The battery pack of claim 9, wherein the request comprises the identifying information stored in the memory of the battery pack, and further comprising comparing on the server the fault parameters with the identifying information stored in the memory of the battery pack, wherein the fault notification is displayed on the display of the mobile device if the identifying information is within the fault parameters.

12. The battery pack of claim 9, wherein the mobile device is further configured to, if it is determined that the battery pack and the battery cell are each not affected by the fault, display a no-fault notification on the display of the mobile device indicating that there are no faults affecting the battery pack or the battery cell.

13. The battery pack of claim 10, wherein the mobile device is further configured to, if the identifying information is determined not to be within the fault parameters, display a no-fault notification on the display of the mobile device indicating that there are no faults affecting the battery pack or the battery cell.

14. The battery pack of claim 9, wherein the fault parameters comprise one or more unique identifiers associated with an affected battery pack for comparison with a unique identifier associated with the battery pack in the identifying information stored in the memory.

15. The battery pack of claim 9, wherein the fault parameters comprise one or more battery pack date codes identifying a date of manufacture of an affected battery pack for comparison with a battery pack date code identifying a date of manufacture of the battery pack in the identifying information in the memory.

16. The battery pack of claim 9, wherein the fault parameters comprise one or more battery pack lot codes identifying a manufacturing lot of an affected battery pack for comparison with a battery pack lot code identifying a manufacturing lot of the battery pack in the identifying information stored in the memory.

17. The battery pack of claim 9, wherein the fault parameters comprise one or more battery pack model codes identifying a model of an affected battery pack for comparison with a battery pack model code identifying a model of the battery pack in the identifying information stored in the memory.

18. The battery pack of claim 9, wherein the fault parameters comprise one or more unique identifiers associated with affected battery cells for comparison with a unique identifier associated with the battery cell of the mobile device stored in the identifying information.

19. The battery pack of claim 9, wherein the fault parameters comprise one or more battery cell date codes identifying a date of manufacture of an affected battery cell for comparison with a battery cell date code identifying a date of manufacture of the battery cell in the identifying information stored in the memory.

* * * * *